(12) United States Patent
Bharucha

(10) Patent No.: US 9,796,340 B2
(45) Date of Patent: Oct. 24, 2017

(54) LOW PROFILE LADDER RACK

(71) Applicant: ROM ACQUISITION CORPORATION, Belton, MO (US)

(72) Inventor: Rashid Bharucha, Roseville, MN (US)

(73) Assignee: ROM Acquisition Corporation, Belton, MO (US)

( * ) Notice: Subject to any disclaimer, the term of this patent is extended or adjusted under 35 U.S.C. 154(b) by 9 days.

(21) Appl. No.: 15/045,360

(22) Filed: Feb. 17, 2016

(65) Prior Publication Data
US 2017/0232904 A1    Aug. 17, 2017

(51) Int. Cl.
*B60R 9/00* (2006.01)
*B60R 9/042* (2006.01)
*B60R 9/048* (2006.01)

(52) U.S. Cl.
CPC .......... *B60R 9/0423* (2013.01); *B60R 9/0485* (2013.01)

(58) Field of Classification Search
CPC ............................ B60R 9/0423; B60R 9/0485
USPC ......................................................... 224/310
See application file for complete search history.

(56) References Cited

U.S. PATENT DOCUMENTS

| | | | |
|---|---|---|---|
| 3,963,136 A * | 6/1976 | Spanke | B60R 9/0423 224/310 |
| 5,035,458 A | 7/1991 | Boensch | |
| 5,297,912 A | 3/1994 | Levi | |
| 5,904,463 A * | 5/1999 | Christensen | B60R 9/00 224/310 |
| 6,427,889 B1 * | 8/2002 | Levi | E06C 5/00 224/310 |
| 6,764,268 B2 * | 7/2004 | Levi | B60R 9/0423 224/310 |
| 7,097,409 B2 * | 8/2006 | Richter | B60R 9/0423 182/127 |
| 9,132,780 B2 * | 9/2015 | Sautter, Jr. | B60R 9/0423 |
| 9,327,654 B2 * | 5/2016 | Richter | B60R 9/0423 |
| 9,415,726 B2 * | 8/2016 | Levi | B60R 9/0485 |
| 2009/0140021 A1 * | 6/2009 | Richter | E06C 5/04 224/310 |
| 2014/0030054 A1 * | 1/2014 | Levi | B60R 9/0485 414/809 |

* cited by examiner

*Primary Examiner* — Derek Battisti
(74) *Attorney, Agent, or Firm* — Nikolai & Mersereau P.A.; Thomas J. Nikolai

(57) ABSTRACT

A ladder rack for a motor vehicle similar to what is shown in U.S. Pat. No. 6,764,268, but differing therefrom in that the top surfaces of the stationary bar member and the movable bar member are coplanar and in a side-by-side relationship when the load being carried is atop the vehicle's roof rather than being stacked, one-above-the-other, as in the prior art. As such, the ladder rack of the present invention exhibits a reduced height profile.

6 Claims, 4 Drawing Sheets

LOW PROFILE LADDER RACK

CROSS REFERENCE TO RELATED APPLICATIONS

None

STATEMENT OF GOVERNMENT SPONSORSHIP

None

BACKGROUND OF THE INVENTION

I. Field of the Invention

This invention relates generally to an apparatus to facilitate the loading and unloading of ladders onto and from the roof of road vehicles and, more particularly, to an improvement over the prior art that reduces the height profile of such apparatus to thereby decreases wind resistance and allows entrance to certain work sights having height restrictions.

II. Discussion of the Prior Art

The closest prior art to the present invention are U.S. Pat. Nos. 5,297,912; 6,427,889 and 6,764,268 to Avraham Y. Levi. Each comprise front and rear 4-bar linkages. In each, a first stationary bar is adapted for attachment to the vehicle's roof and a second movable bar is pivotally joined to the stationary bar by a pair of linkages. An elongated shaft is journaled for rotation in the stationary bars of the front and rear 4-bar linkages and one of the pair of linkages is clamped to the shaft whereby rotation of the shaft results in the rotation of the movable bar on which the ladder(s) being transported are disposed from their position atop the vehicle to a position straddling the side of the vehicle where it is within reach of a workman on the ground.

In each of these prior art designs, the movable bar rests atop the stationary bar when the load is located on the vehicle's roof. This stacked relation of the stationary and movable bars necessarily adds to the overall height of the ladder load while being transported. The height above the vehicle's roof not only results in greater wind resistance and noise at higher speeds of the vehicle, but there are also job sites, like parking garages, that have height restrictions that may be violated.

It is therefore a principle object of the present invention to modify the ladder racks of the prior art so as to reduce the overall height of the ladder rack mechanism by over 50%.

SUMMARY OF THE INVENTION

The instant invention comprises a ladder rack for a motor vehicle. It comprises a front and a rear 4-bar linkage assembly. Each includes a stationary bar member adapted to be attached to the roof of a motor vehicle so as to extend transverse to the longitudinal axis of the motor vehicle. A movable bar member comprising a ladder support is pivotally coupled and offset from the stationary bar member by a pair of rigid links arranged such that rotation of one of the pair of rigid links on each of the front and rear 4-bar linkage assemblies results in the movable bar members of the front and rear 4-bar linkage assemblies moving between a first disposition in which a top surface of the movable bar member is in coplanar relation with a top surface of the stationary bar member to a second disposition aligned and spaced from one side of the vehicle. A connecting rod extends longitudinally between the two 4-bar linkage assemblies, the connecting rod being journaled for rotation in the stationary member of each. One of the pair of rigid links in each of the 4-bar linkage assemblies is coupled to the connecting rod whereby rotation of the connecting rod results in the movable bar members rotating between a position on the roof of the vehicle to a position along and parallel to one side of the vehicle.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals and the several views refer to corresponding parts.

DESCRIPTION OF THE PREFERRED EMBODIMENT

Figure 1:
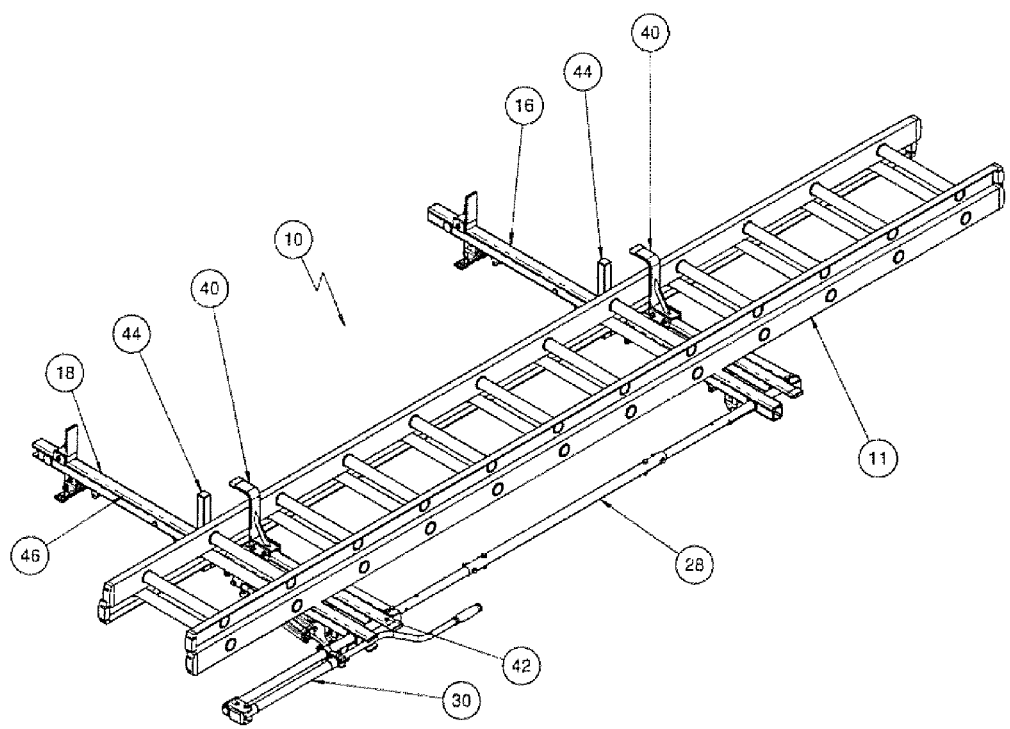
FIG. 1 is an isometric view of the ladder rack of the present invention as it would appear atop the roof of a motor vehicle during transport of the vehicle to a work site.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring now to FIG. 1, indicated generally by numeral 10 is a ladder rack assembly used to facilitate loading and unloading of one or more ladders 11 onto and from the roof of a motor vehicle, such as a pickup truck with a topper unit or a commercial van, neither of which is shown. The view of FIG. 1 shows the ladder 11 in place on the ladder rack 10 as it would appear when positioned on the vehicle's roof, such as when it is being transported to or from a work site.

Figure 2:
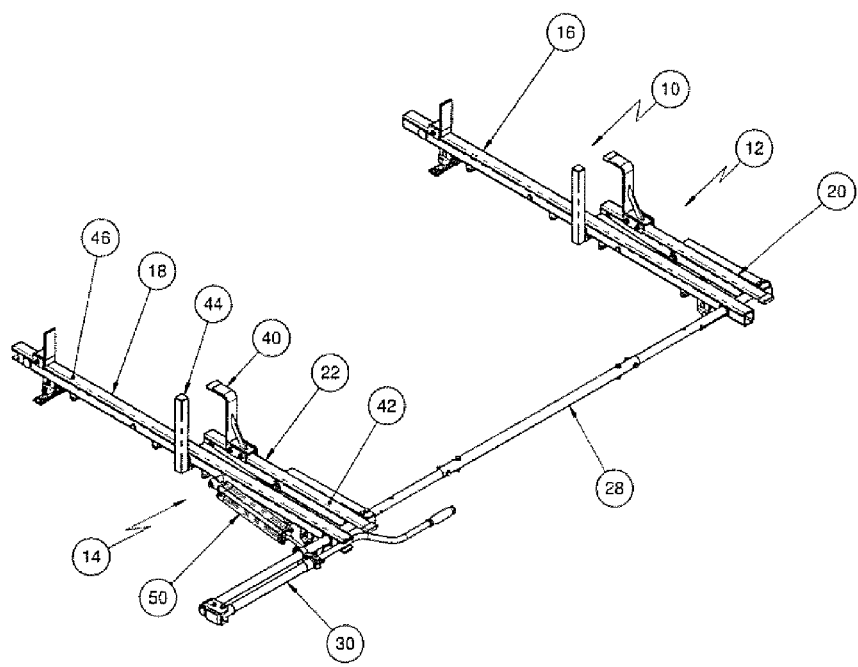
FIG. 2 is an isometric view like FIG. 1, but without a ladder in place.
Figure 3:
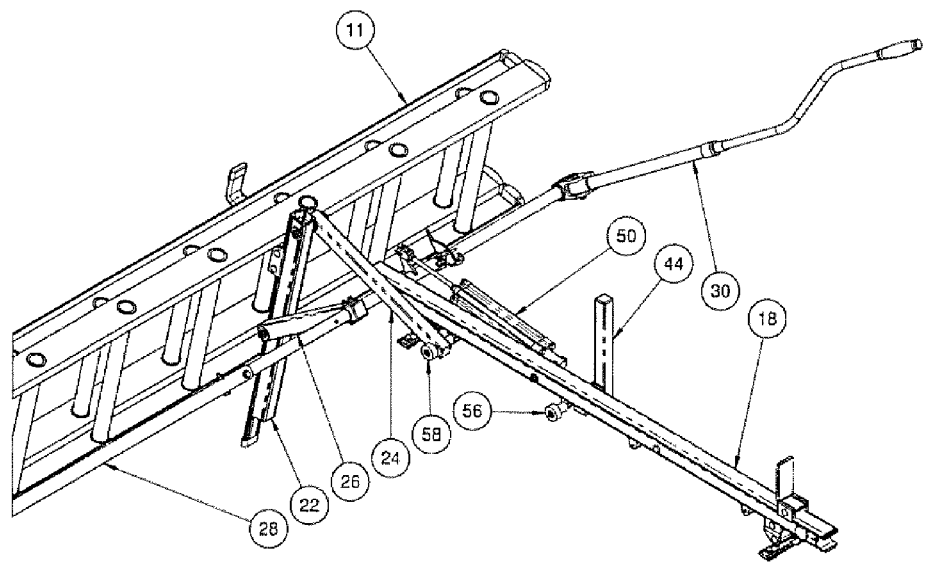
FIG. 3 is a partial view showing the ladder rack in its open position.
Figure 4:
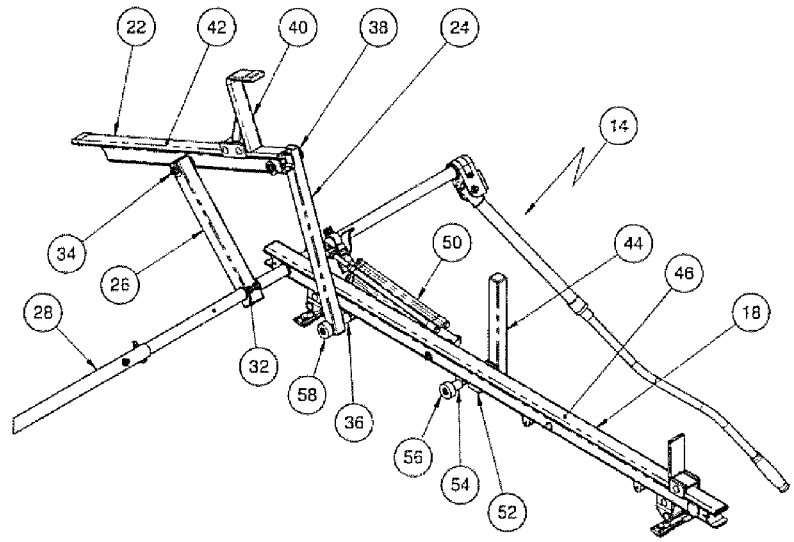
FIG. 4 is a partial view showing the rear 4-bar linkage in a state between its full closed and full open position.

Switching momentarily to FIG. 2, which is like that of FIG. 1 except with the ladder missing, the ladder rack 10 itself is seen to comprise a front 12 and a rear 14, 4-bar linkage assembly, each including a stationary bar member 16, 18 and a movable bar member 20, 22, the two being linked together by a pair of linkages better seen in the close-up view of FIG. 4, which shows the rear 4-bar linkage 14 of FIG. 1. The pair of linkages are identified by numerals 24 and 26 in FIG. 4. A connecting rod 28 is journaled for rotation proximate the outer ends of the stationary bar members 16 and 18 and a fold-up crank member 30 is joined to the connecting rod 28, which when manually manipulated, applies a rotational torque to the connecting rod.

As seen in FIG. 4, a first of the linkages 26 is clamped at one end 32 to the connecting rod 28 and its opposite end is pivotally joined to the movable member at pivot point 34. The linkage member 24 is pivotable about a stub shaft 36 that extends outward from beneath the stationary bar member 18 and the other end of the linkage 24 pivotally joins to an inner end 38 of the movable bar member 22. An L-shaped hook 40 projects perpendicularly from a top surface 42 of the movable bar member 22 and, as best seen in FIG. 1, cooperates with a post 44 extending up from the stationary member 18 to capture a ladder rail between them to preclude shifting of the ladder during transport.

The present invention achieves its advantage over the prior art in the way that the linkage members 24 and 26 are positioned relative to the stationary bar members 16, 18 and the manner in which the linkage 26 joins the movable bar member to the connecting rod 28. Referring to FIG. 4, it is to be noted that the linkage member 24 is able to collapse down to a location sandwiched between the stationary member 18 and the movable member 22 such that the top surface 46 of the stationary member 18 becomes coplanar with the top surface 42 of the movable bar member 22, as can readily be seen in the view of FIG. 2. Rather than being stacked one atop the other as in the prior art, the stationary bar member 18 and the movable bar member 22 in the present invention reside side-by-side with their top surfaces coplanar when the ladder rack is in its closed condition with the ladder load being carried on the vehicle's roof.

Furthermore, as seen in FIG. 2, a hydraulic cylinder 50 is operatively connected between the stationary bar member 18 and the connecting rod 28 so that it does not extend above the level of the top surfaces of the stationary and movable bar members.

Referring again to FIG. 4, extending laterally from a clamp 52 attached to the bottom surface of the stationary bar member 18 is a short cylindrical rod 54 that supports an elastomeric toroid 56 and similarly a toroid 58 is also provided on an extension of the rod 36. The toroids 56 and 58 serve as supports or rests for the linkage 24 and movable member 22 when the ladder rack is in its closed disposition.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. Apparatus for facilitating the loading and unloading of a ladder from the roof of a motor vehicle, comprising in combination:
   a) a first and a second 4-bar linkage assembly, each including a stationary bar member adapted to be attached to the roof of a motor vehicle in parallel, spaced-apart relation so as to extend transverse to the longitudinal axis of said motor vehicle and a movable bar member comprising a ladder support pivotally coupled to and offset from the stationary bar member by a pair of rigid links arranged such that rotation of one of said pair of rigid links on each of the first and second 4-bar linkage assemblies results in said movable bar member comprising said ladder support moving between a first disposition where a top surface of the movable bar member is in coplanar relation with a top surface of the stationary bar member to a second disposition aligned and spaced from one side of the vehicle;
   b) a connecting rod extending longitudinally between the first and second 4-bar linkage assemblies with the connecting rod journaled for rotation in the stationary bar members of each of the 4-bar linkage assemblies and operatively coupled to one of said pair of rigid links in each of the 4-bar linkage assemblies; and
   c) mean for rotating said connecting rod.

2. The apparatus as in claim 1 and further including a shock absorber operatively coupled between the stationary bar member of at least one of the first and second 4-bar linkage assemblies and the connecting rod, the shock absorber positioned so as not to extend above the top surface of the stationary bar member to which it is attached.

3. The apparatus as in claim 1 wherein the means for rotating comprises a lever for applying a torque to the connecting rod.

4. The apparatus as in claim 1 and further including an elastomeric, non-scratch covering on the top surface of both the stationary bar and the movable bar.

5. The apparatus as in claim 1 wherein the individual ones of the pair of linkages pivotally join to the movable bar on opposite side surfaces thereof such that one of said pair of linkages lies between the movable bar and the stationary bar when the top surfaces of the movable bar and the stationary bar are in coplanar relationship.

6. The apparatus as in claim 4 and further including a pair of supports extending laterally from one side of the stationary bar member upon which the movable bar members rest when atop the vehicle's roof.

* * * * *